R. E. & A. GORTON.
SNAP HOOK.

No 42,366. Patented Apr. 19, 1864.

Witnesses
Thos. J. Douglas
G. B. Knapp

Inventors
R. E. Gorton
A. Gorton
per Munn & Co

UNITED STATES PATENT OFFICE.

R. E. GORTON AND A. GORTON, OF FRANKLINTON, NEW YORK.

IMPROVED SNAP-HOOK.

Specification forming part of Letters Patent No. 42,366, dated April 19, 1864.

*To all whom it may concern:*

Be it known that we, R. E. GORTON and A. GORTON, both of Franklinton, in the county of Schoharie and State of New York, have invented a new and improved snap-hook and fastening for harness-traces to secure or attach the latter to whiffletrees and also to the harness; and we do hereby declare that the following is a full, clear, and exact description of the same, reference being had to the accompanying drawings, making a part of this specification, in which—

Figure 1:
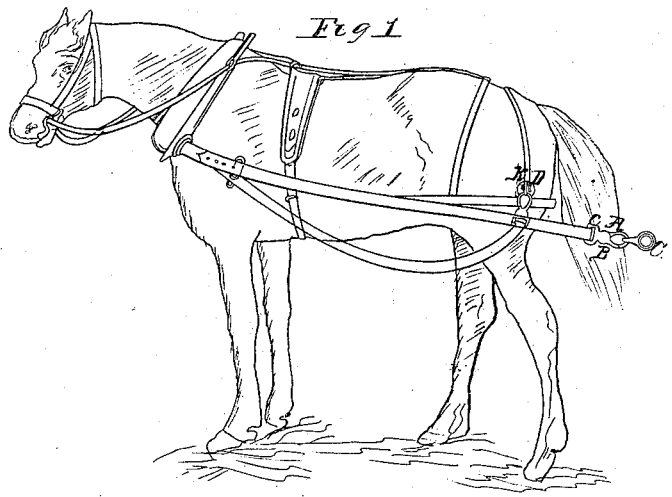
Figure 2:
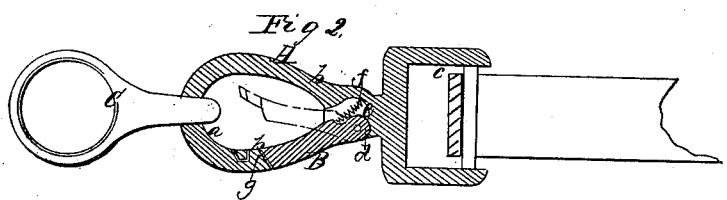
Figure 3:
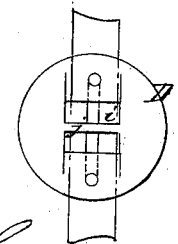
Figure 4:
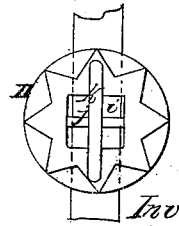

Figure 1 is a side view of our invention applied to a harness; Fig. 2, an enlarged longitudinal section of the same; Fig. 3, an inner side view of one of the staples which are attached to the breeching for the snap-hooks to catch into when the latter are not attached to the whiffletree; Fig. 4, an outer side or face view of Fig. 3.

Similar letters of reference indicate corresponding parts in the several figures.

This invention relates to a new and improved snap-hook or fastening for attaching traces to whiffletrees.

To enable those skilled in the art to fully understand and construct our invention, we will proceed to describe it.

A represents a hook, the main portion *a* of which is of semicircular form, the other portion, *b*, being the shank, which is provided with an eye or loop, *c*, into which the end of the trace is secured.

B represents a snap, one end of which is secured by a pivot, *d*, in a socket, *e*, adjoining the loop *c*, said socket having a spiral spring, *f*, within it, which bears against the snap, and has a tendency to keep the free end of the snap in contact with the end of the hoop *a*, as will be clearly understood by referring to Fig. 2.

The free or disengaged end of the snap B has an opening or eye, *g*, in and extending entirely through it, and said opering or eye, when the snap is closed, receives a projection, *h*, at the end of the hook *a*, as shown in Fig. 2. By this arrangement the snap B is prevented from being moved laterally and from being bent, injured, or strained, if pressed in a lateral direction.

On each end of the whiffletree there is secured an eye, *c*, and into these eyes the snap-hooks A are fastened by pressing inward the snaps B, as shown in red in Fig. 2.

The snap-hooks may be constructed of malleable cast iron or of wrought-iron.

D represents a circular plate which has a square opening, *i*, with a bar, *j*, extending across its center, and at the front side of said plate there is a staple, *k*, which projects outward sufficiently to admit of the snap-hook being fitted in it. There are two of these plates D, and they are fitted on the breeching, one at each side, the back breeching-straps passing through the openings *i* and around the cross-bars *j*.

When the harness is on the horse and the latter not attached to a vehicle, the snap-hooks A are fitted in the staples *k* of said plates and the traces are thereby held up free from the ground, as shown clearly in Fig. 1. By this simple means the traces, when not attached to the whiffletree, are prevented from dragging upon the ground and being trodden upon by the horse.

These plates D, cross-bar *j*, and staples *k*, may all be cast in one piece.

Having thus described our invention, we claim and desire to secure by Letters Patent—

As an improved article of manufacture, a snap-hook, made as herein shown and described, with a spring-socket, *e*, spring *f*, snap B, eye *g*, and projection *h*, all as set forth.

R. E. GORTON.
A. GORTON.

Witnesses:
CALVIN RUSSELL,
ELMORE SITZER.